Jan. 29, 1974    H. J. VON DER PFORDTEN    3,788,951
METHOD FOR GROWING MONOCULTURES
Filed Dec. 7, 1971

INVENTOR.
HANS J. VON DER PFORDTEN
BY
*Townsend and Townsend*
ATTORNEYS 3,788,951
METHOD FOR GROWING MONOCULTURES
Hans J. von der Pfordten, 3463 Ashton Court,
Palo Alto, Calif. 94306
Filed Dec. 7, 1971, Ser. No. 205,608
Int. Cl. C12b 1/02
U.S. Cl. 195—120                     11 Claims

ABSTRACT OF THE DISCLOSURE

A method for growing monocultures wherein a strip of a nutrient material covered by a protective film is inoculated with micro-organisms by removing a portion of the film from the strip, inoculating the film with the micro-organisms, spreading the micro-organisms to separate them from each other, and moving the inoculated film back into contact with the strip to cause the separated micro-organisms to be transferred onto the same. The spreading of the micro-organisms on the film is accomplished by moving a spreading member along the spiral path which intersects an arcuate swath containing a mass of such micro-organisms. A technique for casting the strip with and without an associated antibiotic layer is also disclosed.

---

This invention relates to improvements in the development of micro-organisms and, more particularly, to method and an apparatus for cultivating monocultures which are defined as separate or individual colonies generated from single, isolated micro-organisms.

The conventional technique for growing monocultures is to inject a mass of micro-organisms onto the upper surface of a layer of a nutrient material placed in a petri dish. A first swath across said upper surface is made, such as by the use of a cotton swab, the micro-organisms being deposited in the first swath. Then, an elongated device, such as a platinum wire or wire loop, is drawn across the first swath to form a second swath, then across the second swath to form a third swath, and so on, until a number of swaths have been made. In the last swath, the micro-organisms will have been effectively separated and sufficiently few in number so as to permit the cultivation of monocultures therefrom.

In microbiological work, it is often necessary or desirable to perform laboratory tests in which the aforesaid technique is used many times throughout the course of a given workday. For this reason, it is necessary to have many petri-dishes available to carry out the tests. Moreover, the formation of the swaths in the nutrient material of each petri dish must be performed manually, thus requiring considerable time and effort in preparing the micro-organisms so as to be able to carry out the laboratory tests. A need, therefore, has arisen to simplify the vast amount of work involved in developing monocultures on a large scale. Moreover, a need has also arisen to simplify the preparation of the medium in which growth is to occur so that such medium can be prepared at minimum cost and easily stored for subsequent use.

The present invention is directed to improvements in the techniques for growing monocultures and in the processes for preparing the medium in which such growth is to take place. Specifically, the invention includes an improved method for growing monocultures on a portion of an elongated strip of nutrient material, and further includes apparatus in which the steps of the aforesaid method can be automatically performed. The method includes the inoculation of a removable cover film used to protect the strip, then the movement of the inoculated film into intimate contact with one face of the strip wherein the micro-organisms inoculated on the film and separated from each other are transferred onto the strip for growth in the nutrient medium itself. After the transfer, the film is again removed from the strip, a sealed air space near the inoculated strip is formed to facilitate the monoculture growth. The inoculated portion of the strip can be severed from the remainder of the strip and allowed to serve thereafter the same purpose as a conventional petri dish. In the alternative, the strip may be left intact and used without being cut into pieces.

The apparatus in carrying out the method includes a means for inoculating the film by moving a swab along an arcuate path across one face of the film so as to apply micro-organisms thereto. Then a wire or other such member is moved in a spiral pattern successively across the arcuate path of the swab to spread the micro-organisms and eventually to separate them from each other for transfer onto the nutrient strip when the film is moved into contact therewith. The method of this invention, therefore, provides a simple and expeditious way of growing monocultures and one which can be automated to minimize the time and effort required to perform this function.

Another aspect of the present invention is the technique by means of which the nutrient strip can be formed. Specifically, it can be made by a continuous casting method wherein the strip, in a flowable condition, is forced from a receptacle after the material therein has been processed by autoclaving techniques. The material is directed between a profile tape and a cover film and then cooled to form the strip. It is possible to make the strip so that it can have a number of adjacent, side-by-side sections of different nutrient materials, if desired, to thereby permit study of the growth of monocultures in the presence of such different materials.

A continuous casting technique can also be utilized to form a strip of relatively long length having a plurality of lower, wedge-shaped layers of antibiotic material and an upper, wedge-shaped layer of nutrient material for each lower layer, respectively. The use of such a strip makes it possible to determine the effect on the growth of monocultures in the presence of antibiotic material. Thus, growth of micro-organisms in the nutrient material can be studied by noting the regions of the nutrient material at which growth of monocultures thereon is inhibited.

The primary object of this invention is, therefore, to provide an improved method and apparatus for use in growing monocultures wherein an inoculated film is moved into intimate contact with one face of a strip of nutrient material to inoculate the latter so that the steps of the method can be carried out automatically and the inoculated portion of the strip can then be severed and covered so as to carry out the purposes of a conventional petri dish.

Another object of this invention is to provide an improved apparatus and method for forming the strip of nutrient material for use in growing monocultures wherein the strip is continuously cast after the material has been processed by suitable autoclaving techniques so that the strip, after inoculation, can be severed along its length to form individual specimens which can be studied to determine the growth histories of monocultures in the presence of known types of nutrient media and/or antibiotic media.

A further object of this invention is to provide an improved method for preparing the media in which the growth of monocultures is to occur wherein a plurality of wedge-shaped layers of nutrient material are formed on respective wedge-shaped layers of antibiotic material with the layers being cast to form an elongated strip so that the layers of the strip can be used to study the growth of monocultures as a function of the volume of antibiotic material present below the nutrient material.

Other objects of this invention will become apparent as the following specification progresses, reference being had to the accompanying drawing for an illustration of the invention.

Figure 7:
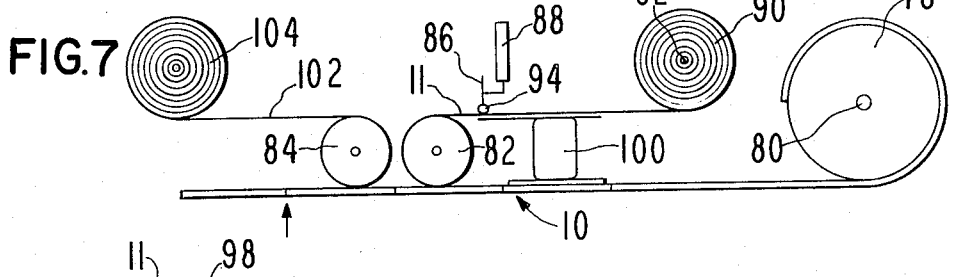
FIG. 7 is a schematic view of an apparatus for use in growing monocultures.
Figure 8:
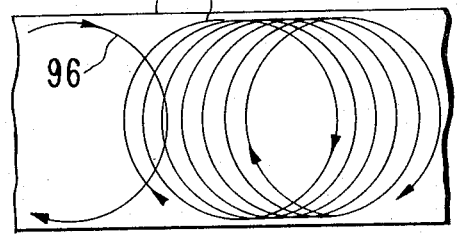
FIG. 8 is an enlarged, top plan view of the strip utilized with the apparatus of FIG. 7, showing the inoculation patterns used to spread the micro-organisms applied thereto.

The apparatus used to carry out the method of growing monocultures is shown in FIG. 7. It utilizes a strip 10 of nutrient material having a protective cover film 11 thereon. The strip is initially made in a manner hereinafter described and is placed in roll form on the apparatus of FIG. 7 to carry out the aforesaid method.

A first embodiment of the apparatus for continuous casting of a nutritive media in strip form is broadly denoted by the numeral 12 (FIG. 1) and includes a pressure vessel 13 containing one or more tubes 14 with each tube adapted to be filled with a supply of dehydrated media and appropriate diluent, the media and diluent being mixed together in the corresponding tube to form the nutrient in a flowable condition; thus, the nutrient can move out of the tube through the lower outlet 16 thereof by pressure exerted in the tube from within pressure vessel 13. A solenoid valve 18 controls the flow of the material from each tube, respectively.

Vessel 13 is adapted to contain a body 20 of water and a heater coil 22 adapted to be coupled to a source of electrical power. The coil is adapted to maintain water 20 heated to a predetermined temperature and pressure vessel 13 is adapted to be maintained under a predetermined autoclaving pressure for a controlled time for the purpose of sterilizing and liquifying the nutritive media in the various tubes 14. Thereafter, the pressure is decreased to a level suitable to drive the flowable, processed materials from respective outlet 16 when solenoid valves 18 are actuated.

A roll 24 of a profile tape 26 is adapted to be mounted adjacent to a first series of vertically spaced rollers 28 on one side of a material passage 30 in vertical alignment with and below the various outlets 16 of tubes 14. Roll 24 is mounted on a shaft 32 for rotation about a generally horizontal axis laterally spaced from the upper roller 28 so that tape 26 can move off roll 24, around the upper roller 28 and downwardly along one side of passage 30.

Figure 1:
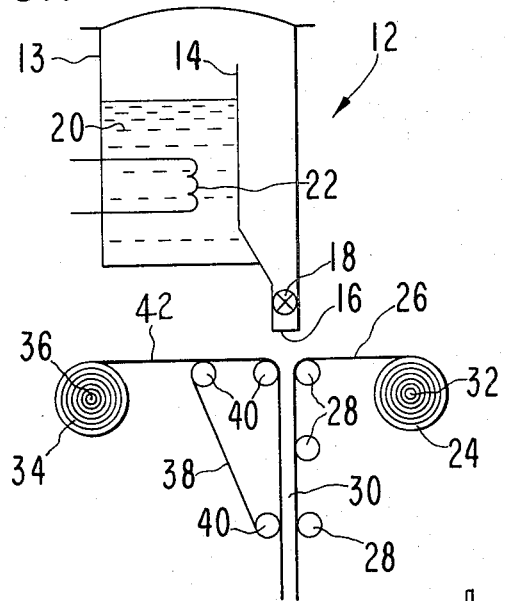
FIG. 1 is a schematic, side elevational view of a first embodiment of the apparatus for forming a strip of nutrient material growing monocultures from microorganisms.

A roll 34 of plastic film or the like is mounted on a shaft 36 parallel with shaft 32 and on the opposite side of passage 30. A cooling belt 38 of the endless type is disposed between passage 30 and roll 34, and belt 38 is coupled with three rollers 40 as shown in FIG. 1, two of the rollers 40 being adjacent to a corresponding pair of rollers 28 so that the plastic film 42 can be pulled off roll 34 and about the upper roller 40 nearest to passage 30, then downwardly past the lower roller 40 on the opposite side of passage 30. Film 42 is adapted to cover the strip of material to assure sterility of the nutrient material.

Figure 3:
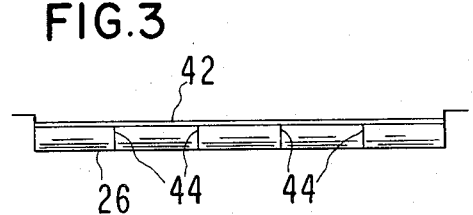
FIG. 3 is a cross-sectional view of the strip formed by using the apparatus of FIGS. 1 and 2.

Tape 26 may be in the shape of a receptacle as shown in FIG. 3 wherein it includes a bottom and a pair of spaced sides for containing the material between the sides. It can also be provided with partitions 44 for receiving respective ribbons or strip sections from the plurality of tubes 14, whereby the materials can be different from each other to permit study of growth of monocultures in several types of media while the remaining media might be of the type which inhibits such growth.

As the material issues from tubes 14, it flows into material passage 30 and is cooled until generally solidified by cooling belt 38. The continuous strip so formed is wound onto a reel for storage.

Figure 5:
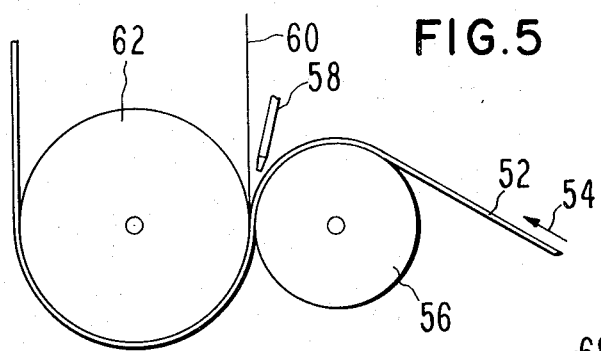
FIG. 5 is a schematic view of another form of apparatus for forming the strip of FIG. 3.

FIG. 5 illustrates another way in which strip 10 can be formed. To this end, a profile tape 52 is moved in the direction of arrow 54 about the convex outer surface of a drum 56 and past a nozzle 58 which directs nutrient material onto profile tape 52. A weir 60 adjacent to one side of drum 56 and nozzle 58 provides a wedge-shaped area for receiving the material, whereupon the tape and material is directed about a cooling drum 62 which causes the material to solidify. Thereafter, the strip is wound on a reel for storage.

While only a single nozzle 58 has been shown, it is possible to use several such nozzles to make the strip in sections as shown in FIG. 3.

A medium used for antibiotic sensitivity testing is cast by a known process by directing a certain kind of antibiotic in a receptacle 46 (FIG. 4) which is initially tilted. The receptacle can be a petri dish or the like. A first layer 48 of antibiotic material is formed in the receptacle with the thickness of the layer progressively decreasing as one extremity of the layer is approached. This is achieved by the tilt of the receptacle.

After solidification of the first layer, a second layer 50 of nutritive medium is poured on top of layer 48 after the receptacle has been returned to its untilted position, whereby layer 50 will be thickest where layer 48 is thinnest and vice versa. Thus, after a certain time, the thinner part of layer 50, with the thicker part of layer 48 therebeneath, will contain a higher concentration of antibiotic by virtue of diffusion than will the opposite end of layer 50. The location of monocultures on layer 50 will, therefore, be an indication of the tolerance of particular microorganisms to the antibiotic of layer 48.

Figure 4:
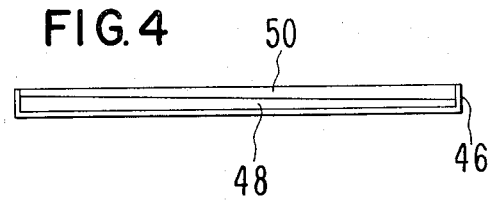
FIG. 4 is a view similar to FIG. 3 but showing another type of strip of nutrient material with the strip having wedge-shaped layers of certain types of materials.
Figure 2:
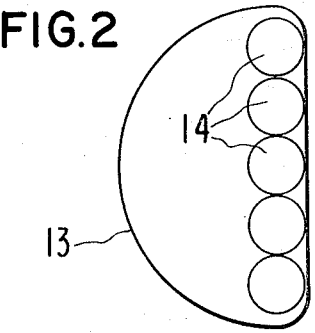
FIG. 2 is a top plan view of a portion of the apparatus of FIG. 1.
Figure 6:
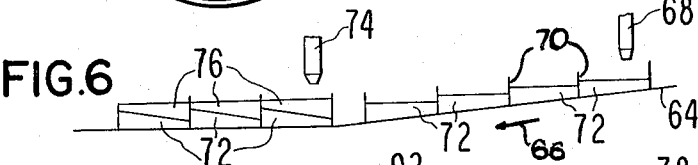
FIG. 6 is a schematic view of another strip having wedge-shaped layers similar to those of FIG. 4.

FIG. 6 shows the way of making a strip of nutrient medium so that the strip will have a plurality of wedge-shaped layers of the type referred to in FIG. 4. To this end, the strip will have a plurality of antibiotic layers beneath, respectively. This is acomplished by a continuous casting technique wherein the first step is to move a profile tape 64 (FIG. 6) in the direction of arrow 66 down an inclined path as one or more nozzles 68 direct antibiotic material into cavities on the tape defined by partitions 70. The resulting layers 72 are then solidified by a cooling means or otherwise, following which the tape is then directed along a horizontal path and one or more nozzles 74 direct a nutrient material onto layers 72 successively to form layers 76 of nutrient material. The strip is then moved onto a reel and stored for subsequent use. The adjacent layers are separated by partitions which form compartments for the layers.

The apparatus for utilizing the aforesaid strips wound on a reel is shown in FIG. 7 and includes a reel 78 mounted on a shaft 80 which is generally horizontal. For purposes of illustration, strip 10 will be described wherein it is unrolled from the reel and moved along a generally horizontal path past a pair of side-by-side rollers 82 and 84. Film 11 is unwrapped from strip 10 and moved about roller 82 as the strip is moved to the left when viewing FIG. 7. The innermost surface of film 11 will be exposed to a holder 86 coupled with a motor 88 mounted in any suitable manner adjacent to the path of travel of the film. The film can be collected in a roll 90 mounted on a shaft 92.

When the film 11 has been peeled back off strip 10, an inoculated swab 94 of some suitable material, such as cotton, nylon or the like, is mechanically placed onto holder 86 and motor 88 is actuated to cause the swab to smear film 11 along a circular path 96 to deposit micro-organisms thereon. The motor then automatically moves swab 94 to a position at which it drops from the holder into a disinfectant. In the next cycle of operation, a platinum wire loop mechanically placed on holder 86 is revolved along a spiral path 98 by motor 88 and engages film 11 while intersecting circular path 96. Each time an intersection occurs, micro-organisms are picked up and spread over film 11. Thereafter, the wire loop is lifted and disinfected by electrical heating. A separate motor can be provided for the platinum wire loop, if desired. Also, the wire loop can be sterilized, when necessary, by directing an electrical current therethrough to heat it to a certain sterilizing temperature.

Then, strip 10 is moved to the right when viewing FIG. 6 so that the inoculated film moves into contact with the adjacent surface of the nutrient strip. A suitable device 100, such as an inflatable cushion, forces the film into intimate contact with a segment of strip 10 to cause transfer of micro-organisms onto the strip. The pressure is released, the strip is moved again to the left and is sealed by a cover sheet 102 carried in a roll 104, sheet 102 being neutral and arranged to provide an air space above the inoculated section of the strip to enhance bacterial growth. Finally, the inoculated strip segment is marked for identification and can remain integral with strip 10 or cut off therefrom for individual processing. If cut from the strip, the strip segment is put on a conveyor belt for transfer to a remote location. Film 11 is wound onto roll 90 and such roll is eventually discarded after strip 10 has been completely used, thus killing and packing the inoculated specimens.

To assure sterile conditions, ultraviolet light is to be used at all times except during the formation of the spiral path 98 and during inoculation. If petri dishes are to be used, the "printing" process described above could still be used analogously. Their cover glasses could be removed and placed back on again by hand or by a pneumatic mechanism. For easier disposal, special paper may be used instead of film 11. The apparatus of FIG. 6 allows for automatic and mass testing when the nutrient and/or antibiotic media are utilized in strip form. The apparatus of FIG. 6 can also be successfully operated by unskilled persons by inserting swabs into holder 86 and dialing an identification code to start the inoculation cycle.

The detection of monocultures along the length of a strip section can be accomplished by photoelectronic means. A strip of a certain length, such as a length equal to one day's supply, may be produced by any of the techniques described above wherein the strip can be stored either on a reel or in a hanging loop similar to the storage of endless magnetic tape. The storage space can be illuminated by ultraviolet light and refrigerated if necessary for sterility and preservation.

The length of the strip which is equivalent to one petri dish may be about three inches. Also, sections of nearby strip compartments may be produced by techniques described above when only a few swabbings interrupted by long time intervals have to be inoculated.

The strip formed by the present invention can be used in many different ways for pollution control. For instance, it can be used to check treated sewage for bacteria count and used also to isolate micro-organisms present in the sewage.

In the claims:

1. A method for growing monocultures from micro-organisms comprising: inoculating a portion of one face of a film with a group of micro-organisms; spreading said micro-organisms on the film to separate the same from each other; placing the film in contact with the surface of a strip of nutrient material on a profile tape to cause at least a part of said group of micro-organisms to be transferred onto said surface; removing the film from said surface; and forming a sealed air space adjacent to said surface to permit growth of said micro-organisms thereon.

2. A method as set forth in claim 1, wherein said inoculating step includes applying the micro-organisms to said film face along an arcuate path, said spreading step including moving at least certain of the micro-organisms transversely of and across said arcuate path and along a spiral path.

3. A method as set forth in claim 1, wherein said inoculating step includes moving a swab containing said micro-organisms across and in contact with said film face, said spreading step including moving an elongated member in contact with said face and along a spiral path in sufficient proximity to said arcuate path to cause said member to intersect said arcuate path at a number of locations along the same.

4. A method as set forth in claim 1, wherein is included the step of forcing the film into contact with said surface.

5. A method as set forth in claim 1, wherein said layer comprises a strip of said material on a profile tape, said surface being on an end segment of the strip, and wherein is included the steps of moving said strip in one direction as the film is placed in contact therewith, and moving the strip in the opposite direction as the film is removed therefrom.

6. A method as set forth in claim 5, wherein said forming step includes moving a cover sheet into covering relationship to said surface as the strip moves in said opposite direction.

7. A method of growing monocultures from micro-organisms comprising: providing a strip of a nutrient material on a profile tape having a cover film covering one surface of the strip; removing a portion of the film from a segment at one end of the strip; inoculating the normally innermost surface of said film portion with a group of micro-organisms; spreading said micro-organisms on the film to separate the same from each other; moving said inoculated film portion into contact with said strip segment to permit the micro-organisms to be transferred onto said surface; removing the film portion from said strip segment; and applying a cover sheet to the strip segment to seal the same and to form a closed air space adjacent to the surface of said segment having the transferred micro-organisms thereon.

8. A method as set forth in claim 7, wherein said inoculating step includes moving a swab containing the micro-organisms in a swath across said innermost surface of the film along an arcuate path, and said spreading step including moving a projection in contact with said film along a spiral path in intersecting relationship to said circular path.

9. A method as set forth in claim 7, wherein is included the step of applying pressure to the inoculated film portion to press the same against said strip segment.

10. A method as set forth in claim 7, wherein the strip is initially in the form of a roll, said removing step including partially unrolling the strip from said roll, and peeling said film portion off said strip as the latter is unrolled.

11. A method as set forth in claim 7, wherein said providing step includes moving a mass of said material in a flowable condition along a confined path having the dimensions of said strip, and allowing the material mass as solidify to form said strip.

References Cited
UNITED STATES PATENTS

| | | | |
|---|---|---|---|
| 3,416,998 | 12/1968 | Streitfeld | 195—103.5 |
| 3,623,958 | 11/1971 | Fitzgerald | 195—127 |
| 3,632,478 | 1/1972 | Fink | 195—120 |

OTHER REFERENCES

Hartman: Miniaturized Microbial Methods, 1968, pp. 56 and 57, Academic Press, New York, N.Y.

A. LOUIS MONACELL, Primary Examiner

R. M. ELLIOTT, Assistant Examiner

U.S. Cl. X.R.

195—103.5, 139